(12) United States Patent
Hasegawa et al.

(10) Patent No.: US 7,480,091 B2
(45) Date of Patent: Jan. 20, 2009

(54) DELAY-LINE DEMODULATOR AND METHOD OF ADJUSTING A PHASE SHIFT IN THE DEMODULATOR

(75) Inventors: Junichi Hasegawa, Tokyo (JP); Kazutaka Nara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/042,768

(22) Filed: Mar. 5, 2008

(65) Prior Publication Data
US 2008/0239465 A1 Oct. 2, 2008

(30) Foreign Application Priority Data
Mar. 6, 2007 (JP) .............................. 2007-055888
Feb. 29, 2008 (JP) .............................. 2008-049222

(51) Int. Cl.
*G02F 2/00* (2006.01)
(52) U.S. Cl. .......................... 359/325; 375/324; 385/1; 398/205
(58) Field of Classification Search ................. 359/237, 359/325; 375/324, 350; 398/204, 205, 214; 385/1–9
See application file for complete search history.

(56) References Cited
U.S. PATENT DOCUMENTS
7,259,901 B2 * 8/2007 Parsons et al. .............. 359/237

2005/0058397 A1 3/2005 Doerr
2005/0058398 A1 3/2005 Doerr
2007/0177151 A1 * 8/2007 Isomura et al. ............. 356/477

FOREIGN PATENT DOCUMENTS
JP 2005-92217 4/2005

OTHER PUBLICATIONS
Hiroshi Kawashima, et al., "Phase trimming of silica-based PLC by local heating method", Electronics Society of Japan, C-3-12, 2006, p. 134.
U.S. Appl. No. 12/041,231, filed Mar. 3, 2008, Hasegawa et al.
U.S. Appl. No. 12/042,768, filed Mar. 5, 2008, Hasegawa et al.
U.S. Appl. No. 12/056,892, filed Mar. 27, 2008, Nara.

* cited by examiner

*Primary Examiner*—Hemang Sanghavi
(74) *Attorney, Agent, or Firm*—Oblon, Spivak, McClelland, Maier & Neustadt, P.C.

(57) ABSTRACT

In a method of phase adjustment for the demodulator 1 of the present invention, the phase adjustment is performed by driving any one of the heaters on the two waveguides 10 and 11 in the Mach-Zehnder interferometer (MZI) 6 and on the two waveguides 14 and 15 in the MZI 7. In case that an initial phase difference between the MZIs 6 and 7 smaller than a required phase difference as $\pi/2$ therebetween, the heaters C and D are driven, that are formed on the first waveguide 10 in the MZI 6, and the heaters G and H are driven, that are formed on the second waveguide 15 in the MZI 7. In case that the initial phase difference is larger than the required phase difference ($\pi/2$) therebetween, the heaters A and B formed on the second waveguide 11 in the MZI 6, and the heaters E and F formed on the first waveguide 14 in the MZI 7 are driven.

11 Claims, 4 Drawing Sheets

DELAY-LINE DEMODULATOR AND METHOD OF ADJUSTING A PHASE SHIFT IN THE DEMODULATOR

BACKGROUND OF THE INVENTION

1. Technical Field

The present invention relates to a delay-line demodulator and a method of adjusting a phase shift the demodulator.

2. Related Arts

In recent years, studies for realizing an optical transmission system of a high transfer rate (for example, a 40 Gbps transfer rate) have been performed against a backdrop of a rapid spread of a broadband communication. However, in the case of increasing the transfer rate, there is provided a problem that a quality of a communication line deteriorates because a transmit duration per bit of light signals decreases and a signal waveform deteriorates due to a characteristic of an optical fiber. Moreover, it becomes hard to construct a network system with using a conventional fiber network because a repeater is required for such as converting a light signal into an electric signal during passing a transmission path and reconverting the electric signal into a light signal, for performing a long haul transmission of a 40 Gbps transfer rate. Therefore, a differential quadrature phase shift keying (DQPSK) method has been currently investigated and developed, which is able to reduce the deterioration of the signal waveform by widening the transmit duration per bit of a light signal. It becomes able to transmit a distance by using the DQPSK four times longer than that by using a conventional binary phase shift keying (BPSK) method for the 40 Gbps transmission, as the DQPSK is the phase shift keying method to transmit four data (0, 1, 2, 3) with corresponding to four different light phases (θ, θ+π/2, θ+π, θ+3π/2) of a carrier wave. It is considered that it becomes possible to construct the network system among large cities with using the conventional fiber network by such the DQPSK method.

A brief configuration of a conventional optical transmission system (an optical transmitter and receiver) using the DQPSK method is shown in FIG. 4. Such the optical transmission system comprises an optical transmitter 100 and an optical receiver 101. There are provided such as a demodulator 102, balanced receivers 103, 103, an electric circuit 105 and the like in the optical receiver 101.

An optical signal is transmitted from the optical transmitter 100 to an optical fiber 106, as a DQPSK signal including four data (0, 1, 2, 3) modulated into four different light phases (0, π/2, π, 3π/2) of a carrier wave respectively. The DQPSK signal transmitted from the optical fiber 106 to the optical receiver 101 is converted into a light intensity signal in the demodulator 102. Moreover, the light intensity signal is converted into an electric signal by the balanced receiver 103, 103, and the data of the DQPSK signal are demodulated. Furthermore, such as a decoding process or the like is performed in the electric circuit 105.

Such the demodulator 102 is a planar lightwave circuit (PLC) type demodulator as shown in FIG. 5, which is comprised of a Y-branch waveguide 200 and two Mach-Zehnder interferometers (MZIs) 210, 220. Here, a phase of the MZI 220 is required to be shifted as π/2 corresponding to the phase of the MZI 210. Moreover, the MZI 210 comprises: two directional couplers 211 and 212; and two waveguides 213 and 214 having a different waveguide length connected to between the two directional couplers 211 and 212. Meanwhile, the MZI 220 comprises: two directional couplers 221 and 222; and two waveguides 223 and 224 having a different waveguide length connected to between the two directional couplers 221 and 222.

It is quite hard to control precisely a relative phase between the two MZIs 210 and 220 due to a fluctuation of a refractive index of a glass member during fabricating the PLC. Therefore, it is required to adjust the phase of the two MZIs 210 and 220 using a phase trimming technology for adjusting the phase at the parts of the waveguides 213 and 223 after fabricating the PLC. Such the phase trimming technology is developed in a variety of types. Among the various types of the phase trimming technology, a local heat phase trimming technology with using a change in a permanent refractive index by localized heating using a thin film heater is an actual method for realizing the phase trimming in high accuracy without particular devices and equipments being required.

Therefore, thin film heaters 215 and 225 are formed on the waveguides 213 and 223 for phase trimming as shown in FIG. 5. Regarding the local heat phase trimming, it is considered that an equivalent refractive index of a core is changed by a photoelastic effect, because a stress internalized in a PLC chip or a stress caused by the thin film heaters is irreversibly changed by heater heating of a localized and high power (several W/mm). There is disclosed such the local heat phase trimming technology for example in a published Japanese patent application No. 2005-092217 (hereinafter, it is described as a document 1), or there is reported by Kawashima et. al, IEICE Electronics Society of Japan 2006, C-3-12 (hereinafter, it is described as a document 2).

Regarding the above mentioned local heat phase trimming, while a relatively large amount of phase shift is able to be obtained in proportion to a heat duration or a power, there is a problem that a polarization dependent frequency (PDF) becomes gradually large (refer to the document 2). Especially in the demodulator for the optical transmission system (the optical transmitter and receiver) using the DQPSK method, it does not work as a device when the PDF becomes large, due to a narrow spectrum width thereof. For example, an allowable PDF is approximately 0.1 GHz for the optical transmitter and receiver using the DQPSK method of the 40 Gbps. Hence, it is quite hard to realize the demodulator having the small PDF.

BRIEF SUMMARY OF THE INVENTION

The present invention is presented with having regard to the above mentioned conventional problems, and has an object is to provide a delay-line demodulator having an excellently small polarization dependent frequency (PDF) and a method of adjusting a phase shift the demodulator.

A demodulator according to a first aspect of the present invention comprises: a first 2×2 Mach-Zehnder interferometer and a second 2×2 Mach-Zehnder interferometer connected to two waveguides branched from an optical input waveguide respectively; at least one heater formed on each of two waveguides having different waveguide length and forming the first Mach-Zehnder interferometer; and at least one heater formed on each of the two waveguides having different waveguide length and forming the second Mach-Zehnder interferometer.

According to the aspect, a phase is shifted to a shorter wavelength side at the time of driving a heater (a first heater) on the waveguide having a shorter waveguide length (a first waveguide) of the two waveguides, or the phase is shifted to a longer wavelength side at the time of driving a heater (a second heater) on the waveguide having a longer waveguide length (a second waveguide), in each of the Mach-Zehnder interferometers. Thus, it is able to adjust some of the phase adjustment amount by the heaters at the first Mach-Zehnder interferometer (MZI) side and to adjust the remaining amount by the heaters at the second MZI side, by driving any one of the heaters formed on the two waveguides in the first MZI and any one of the heaters formed on the two waveguides in the second MZI respectively. Hence, it becomes able to decrease a power (a voltage) applied to each of the heaters, and to shorten a period of power supplying to each of such the heaters. Therefore, it becomes able to realize the demodulator having the excellently small polarization dependent frequency (PDF).

In a demodulator according to a second aspect of the present invention, two heaters are formed on each of the two waveguides in the first Mach-Zehnder interferometer, and two heaters are formed on each of the two waveguides in the second Mach-Zehnder interferometer.

According to the aspect, either one pair of the two heaters are driven, which is a pair of (C and D) or (A and B) formed on each of the two waveguides in the first MZI respectively, and which is a pair of (E and F) or (G and H) formed on each of the two waveguides in the second MZI respectively. Thus, it is able to adjust some of the phase adjustment amount by the two heaters at the first MZI side and to adjust the remaining amount by the two heaters at the second MZI side.

For example, the heaters (C and D) are driven, that are formed on the waveguide having the shorter waveguide length (the first waveguide) in the first MZI, and the heaters (G and H) are driven, that are formed on the waveguide having the longer waveguide length (the second waveguide) in the second MZI, in case that an initial phase difference between the two MZIs is smaller than a required phase difference therebetween ($\pi/2$ for example). On the contrary, the heaters (A and B) are driven, that are formed on the waveguide having the longer waveguide length (the second waveguide) in the first MZI, and the heaters (E and F) are driven, that are formed on the waveguide having the shorter waveguide length (the first waveguide) in the second MZI, in case that the initial phase difference is larger than the required phase difference therebetween ($\pi/2$ for example).

Thus, it is able to decrease the power (the voltage) applied to each of the heaters, and to shorten the period of power supplying to each of such the heaters, in each case that the initial phase difference is smaller or larger than the required phase difference. Therefore, it becomes able to realize the demodulator having the excellently small polarization dependent frequency (PDF).

In a demodulator according to a third aspect of the present invention, a half-wave plate is inserted into a central part of the two waveguides in the first Mach-Zehnder interferometer and a central part of the two waveguides in the second Mach-Zehnder interferometer.

According to the aspect, it is able to suppress a polarization dependent frequency (PDF) of a transmittance spectrum for a signal light propagating through each of the MZIs. Thus, it becomes able to realize the demodulator having a further small polarization dependent frequency (PDF).

In a demodulator according to a fourth aspect of the present invention, the two heaters are formed on each of the two waveguides in the first Mach-Zehnder interferometer for sandwiching the half-wave plate therebetween, and the two heaters are formed on each of the two waveguides in the second Mach-Zehnder interferometer for sandwiching the half-wave plate therebetween.

In a demodulator according to a fifth aspect of the present invention, a waveguide having a longer waveguide length of the two waveguides in each of the first and the second Mach-Zehnder interferometers is turned at a central part thereof, for the central part of the waveguide having the longer waveguide length coming close to another waveguide having a shorter waveguide length.

According to the aspect, it is able to package in a small size for a device, because the waveguide having the longer waveguide length of the two waveguides in each of the MZIs is turned at the central part respectively thereof, for the central part of the waveguide having the longer waveguide length coming close to another waveguide having the shorter waveguide length. That is to say, a substrate size of a demodulator of a planar lightwave circuit (PLC) type cannot help but become enlarged, wherein such as the MZIs and the like are formed thereon, due to widely extending outwards the central part of the waveguide having the longer waveguide length in the case of not turning the waveguide having the longer waveguide length (the second waveguide) in each of the MZIs respectively. On the contrary, it is able to provide the small sized substrate for the PLC type demodulator according to the aspect, because the waveguide having the longer waveguide length in each of the MZIs is turned at the central part respectively thereof, for not being widely extended outwards the central part of the waveguide having the longer waveguide length in each of the MZIs respectively.

Moreover, it is able to improve a decrease in a manufacturing cost, as not only an expensive half-wave plate of large size is required but also just one small one half-wave plate becomes available, in the case of arranging any one of the half-wave plates in a region including the central parts of the two waveguides in the first MZI and the central parts of the two waveguides in the second MZI.

A method according to a sixth aspect of the present invention is a method of adjusting a phase shift in a delay-line demodulator in which a first 2×2 Mach-Zehnder interferometer and a second 2×2 Mach-Zehnder interferometer are connected to two waveguides branched from an optical input waveguide respectively, at least one heater is formed on each of two waveguides having different waveguide length and forming the first Mach-Zehnder interferometer, and at least one heater is formed on each of two waveguides having different waveguide length and forming the second Mach-Zehnder interferometer, the method comprises: a first step driving the heater on any one of the two waveguides in the first Mach-Zehnder interferometer; and a second step driving the heater on any one of the two waveguides in the second Mach-Zehnder interferometer, wherein a phase adjustment of the first and the second Mach-Zehnder interferometers is performed by driving the heater at the first step and by driving the heater at the second step.

According to the aspect, the phase of each of the first and the second MZIs are adjusted by driving the heaters on either one of the two waveguides in each of the first and the second MZIs. That is to say, the phase is shifted to a shorter wavelength side at the time of driving the heater (the first heater) on the waveguide having the shorter waveguide length (the first waveguide) of the two waveguides, or the phase is shifted to the longer wavelength side at the time of driving the heater (the second heater) on the waveguide having the longer waveguide length (the second waveguide), in each of the MZIs. Thus, it is able to adjust some of the phase adjustment amount by the heaters at the first MZI side and to adjust the remaining amount by the heaters at the second MZI side, by driving any one of the heaters formed on the two waveguides in the first MZI and any one of the heaters formed on the two waveguides in the second MZI respectively. Hence, it becomes able to decrease the power (the voltage) applied to each of the heaters, and to shorten the period of power supplying to each of such the heaters. Therefore, it becomes able to realize the demodulator having the excellently small polarization dependent frequency (PDF).

A method of adjusting the phase shift in the delay-line demodulator according to a seventh aspect of the present invention, wherein the heater is driven at the first step, which is formed on a first waveguide having a shorter waveguide length of the two waveguides in the first Mach-Zehnder interferometer, and the heater is driven at the second step, which is formed on a second waveguide having a longer waveguide length of the two waveguides in the second Mach-Zehnder interferometer, in case that an initial phase difference between the first and the second Mach-Zehnder interferometers is smaller than a required phase difference therebetween, and wherein the heater is driven at the first step, which is formed on a second waveguide having a longer waveguide length of the two waveguides in the first Mach-Zehnder interferometer, and the heater is driven at the second step, which is formed on a first waveguide having a shorter waveguide length of the two waveguides in the second Mach-Zehnder interferometer, in case that the initial phase difference is larger than the required phase difference therebetween.

According to the aspect, it is able to decrease the power (the voltage) applied to each of the heaters, and to shorten the period of power supplying to each of such the heaters, in each case that the initial phase difference is smaller or larger than the required phase difference. Therefore, it becomes able to realize the demodulator having the excellently small polarization dependent frequency (PDF).

A method of adjusting the phase shift in the delay-line demodulator according to an eighth aspect of the present invention, wherein absolute values of a phase adjustment amount for both of the first and the second Mach-Zehnder interferometers are the same.

According to the aspect, it is able to adjust half of a required phase adjustment amount by driving any one of the heaters at the first MZI side and to adjust the remaining half by driving the any one of the heaters at the second MZI side. Thus, it is able to decrease the power (the voltage) applied to each of the heaters, and to shorten the period of power supplying to each of such the heaters. Therefore, it becomes able to realize the demodulator having the excellently small polarization dependent frequency (PDF).

A method of adjusting the phase shift in the delay-line demodulator according to a ninth aspect of the present invention, wherein the absolute value of the phase adjustment amount for each of the first and the second Mach-Zehnder interferometers is a half of a phase subtracted the initial phase difference between the first and the second Mach-Zehnder interferometers from π/2.

According to the aspect, it is able to adjust half of the required phase adjustment amount by driving any one of the heaters at the first MZI side and to adjust the remaining half by driving the any one of the heaters at the second MZI side.

A method of adjusting the phase shift in the delay-line demodulator according to a tenth aspect of the present invention, wherein two heaters are formed on each of the two waveguides in the first Mach-Zehnder interferometer, and two heaters are formed on each of the two waveguides in the second Mach-Zehnder interferometer, wherein the two heaters (C and D) formed on the first waveguide in the first Mach-Zehnder interferometer are driven at the first step, and the two heaters (G and H) formed on the second waveguide in the second Mach-Zehnder interferometer are driven at the second step, in case that the initial phase difference is smaller than the required phase difference therebetween, and wherein the two heaters (A and B) formed on the second waveguide in the first Mach-Zehnder interferometer are driven at the first step, and the two heaters (E and F) formed on the first waveguide in the second Mach-Zehnder interferometer are driven at the second step, in case that the initial phase difference is larger than the required phase difference therebetween.

According to the aspect, it is able to further decrease the power (the voltage) applied to each of the heaters, and to further shorten the period of power supplying to each of such the heaters, in each case that the initial phase difference is smaller or larger than the required phase difference. Therefore, it becomes able to realize the demodulator having the excellently small polarization dependent frequency (PDF).

A method of adjusting the phase shift in the delay-line demodulator according to an eleventh aspect of the present invention, wherein the first step and the second step are performed at a state in which a half-wave plate are inserted into a central part of the two waveguides in each of the first and the second Mach-Zehnder interferometers.

According to the aspect, it is able to suppress the polarization dependent frequency of the transmittance spectrum for the signal light propagating through each of the MZIs, by inserting the half-wave plate into any one of the central parts of the two waveguides in any one of the MZIs. Therefore, it becomes able to realize the demodulator having the further small polarization dependent frequency (PDF).

BRIEF DESCRIPTION OF THE DRAWINGS

The above and other objects and features of the invention will appear more fully hereinafter from a consideration of the following description taken into connection with the accompanying drawing wherein one example is illustrated by way of example, in which.

DETAILED DESCRIPTION OF THE INVENTION

A delay-line demodulator and a method of adjusting a phase shift the demodulator, according to one embodiment embodied the present invention, will be described in detail below, based on the drawings.

An Embodiment

Figure 1:
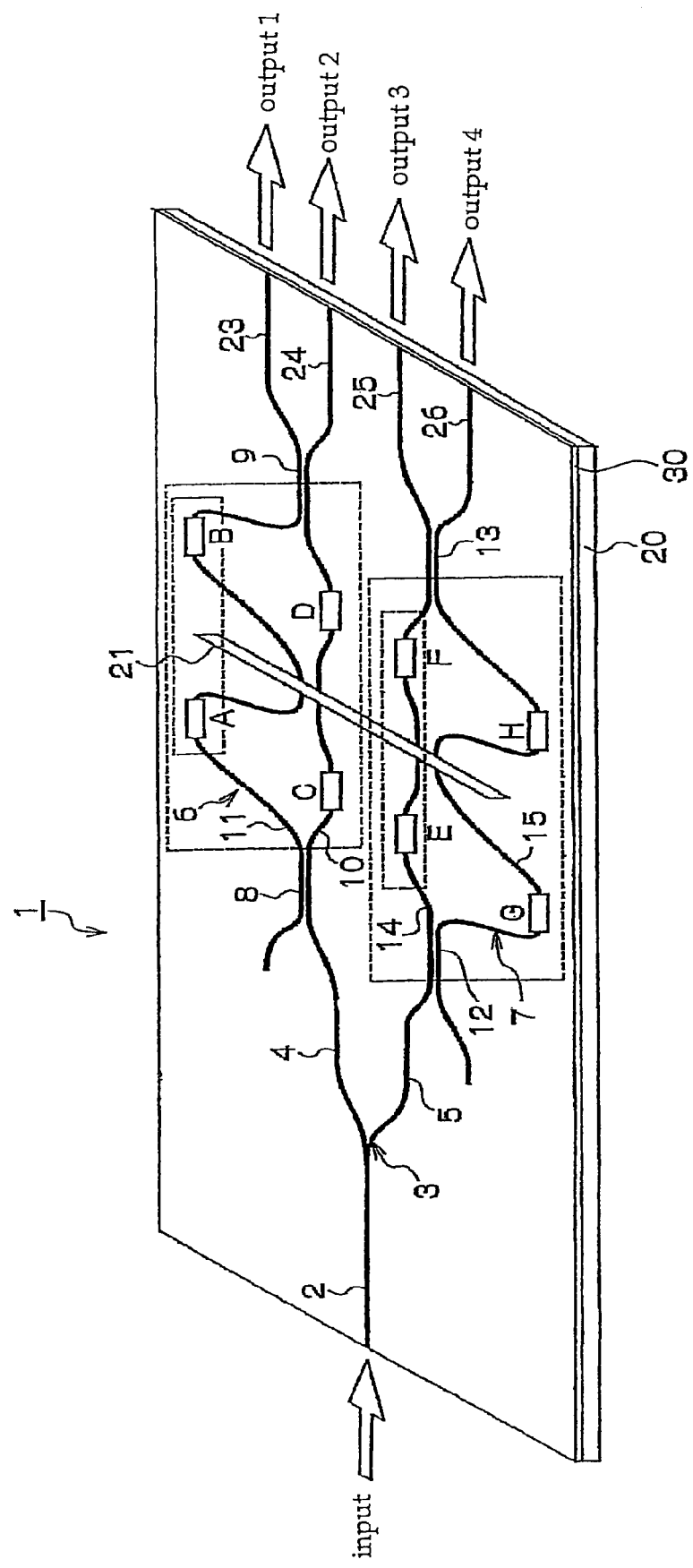
FIG. 1 is a perspective view showing a schematic configuration of a delay-line demodulator according to one embodiment of the present invention.

FIG. 1 shows a schematic configuration of a delay-line demodulator according to one embodiment of the present invention.

Figure 4:
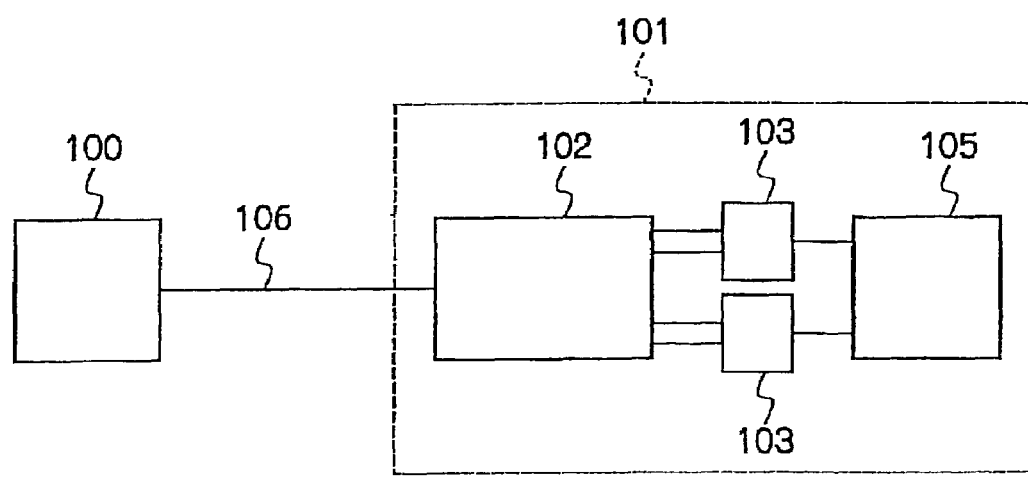
FIG. 4 is a block diagram showing a brief configuration of a conventional optical transmission system using a DQPSK method.
Figure 5:
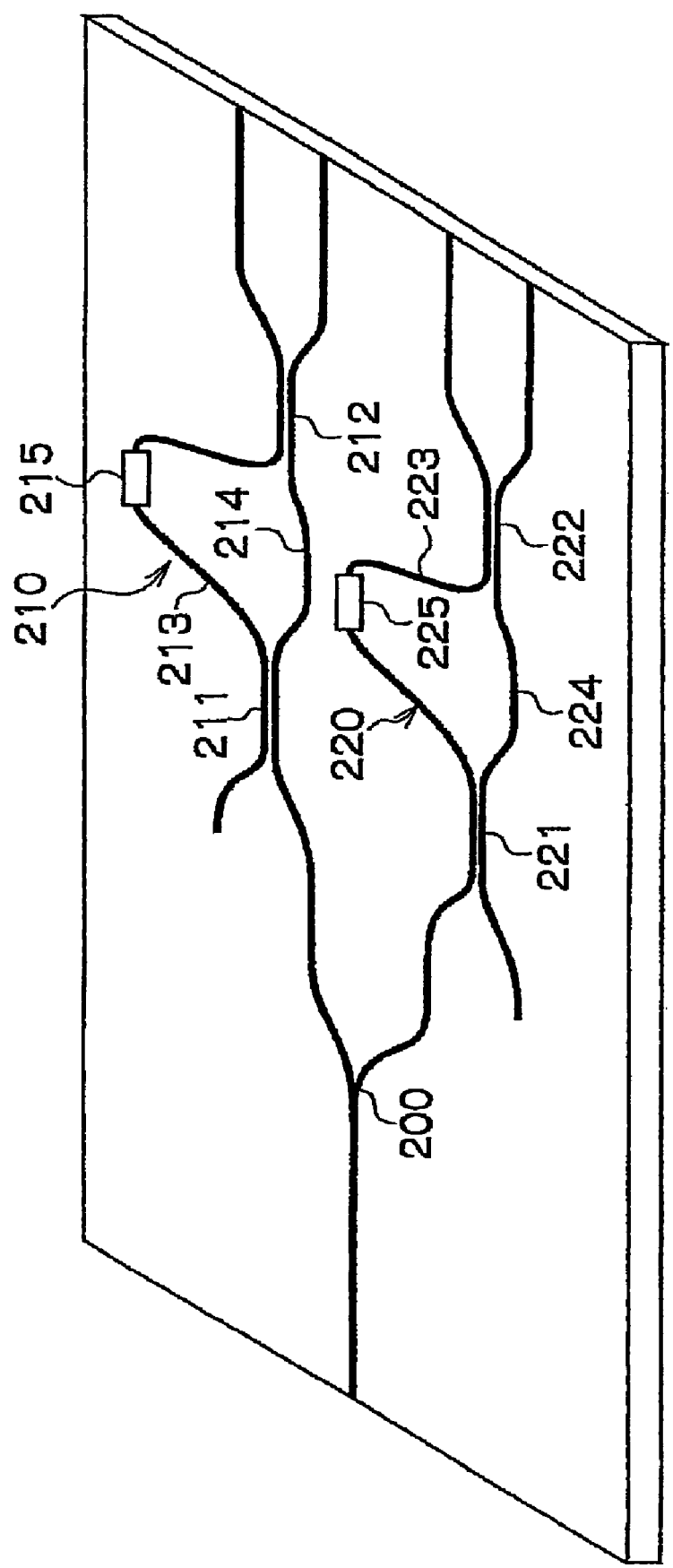
FIG. 5 is a perspective view showing a conventional demodulator comprised of a planar lightwave circuit.

A delay-line demodulator 1 shown in FIG. 1 is to be used for an optical receiver in an optical transmitting and receiving device, as similar to the demodulator 102 shown in FIG. 4.

The delay-line demodulator 1 is a planar lightwave circuit (PLC), which comprises an optical input waveguide 2, a Y-branch waveguide 3 for branching the optical input waveguide 2, and a first 2×2 Mach-Zehnder interferometer (MZI) 6 and a second 2×2 Mach-Zehnder interferometer 7 connected to each of two waveguides 4 and 5 branched by the Y-branch waveguide 3 respectively.

Moreover, the first MZI 6 comprises two directional couplers 8 and 9, and two waveguides 10 and 11 having a different waveguide length connected to between the two directional couplers 8 and 9 respectively. Here, in the following description for the two waveguides 10 and 11, the waveguide 10 having a shorter waveguide length is defined as the first waveguide and the waveguide 11 having a longer waveguide length is defined as the second waveguide.

Similarly, the second MZI 7 comprises two directional couplers 12 and 13, and two waveguides 14 and 15 having the different waveguide length connected to between the two directional couplers 12 and 13 respectively. Here, in the following description for the two waveguides 14 and 15, the waveguide 14 having the shorter waveguide length is defined as the first waveguide and the waveguide 15 having the longer waveguide length is defined as the second waveguide.

In the present embodiment, a first pair of thin film heaters (two heaters) C and D are formed on the first waveguide 10 of the two waveguides 10 and 11, and a second pair of thin film heaters (two heaters) A and B are formed on the second waveguide 11, in the first MZI 6. The first thin film heaters C and D are formed on a upper cladding layer 30 for the first waveguide 10 formed on a silicon substrate 20. The second thin film heaters A and B are also formed on the upper cladding layer 30 for the second waveguide 11 formed on the silicon substrate 20.

Similarly, a first pair of thin film heaters E and F are formed on the first waveguide 14 of the two waveguides 14 and 15, and a second pair of thin film heaters G and H are formed on the second waveguide 15, in the second MZI 7. The first thin film heaters E and F are formed on the upper cladding layer 30 for the first waveguide 14 formed on the silicon substrate 20. The second thin film heaters G and H are also formed on the upper cladding layer 30 for the second waveguide 15 formed on the silicon substrate 20.

Moreover, a half-wave plate 21 as just one plate is arranged at both central parts of the two waveguides 10 and 11 in the first MZI 6, and at both central parts of the two waveguides 14 and 15 in the second MZI 7. Furthermore, the half-wave plate 21 is inserted into a ditch formed on the silicon substrate 20.

Moreover, the second waveguide 11 in the first MZI 6 is formed to be turned at the central part thereof, for the central part of the second waveguide 11 coming close to the first waveguide 10. Similarly, the second waveguide 15 in the second MZI 7 is formed to be turned at the central part thereof, for the central part of the second waveguide 15 coming close to the first waveguide 14.

Furthermore, two optical output waveguides 23 and 24 are connected to the directional coupler 9 in the first MZI 6. Similarly, two optical output waveguides 25 and 26 are connected to the directional coupler 13 in the second MZI 7.

Next, a method of adjusting a phase shift the delay-lin demodulator 1 will be described in detail below.

Here, a phase of the second MZI 7 is required to be shifted as π/2 from the phase of the first MZI 6.

1. In case that an initial phase difference between the two MZIs 6 and 7 is smaller than the required phase difference as π/2 therebetween, the first thin film heaters C and D in the first MZI 6 and the second thin film heaters G and H in the second MZI 7 are driven.

That is to say, there are performed the first step to drive the thin film heaters (A and B, or C and D) on either one waveguide of the two waveguides 10 and 11 in the first MZI 6, and the second step to drive the thin film heaters (E and F, or G and H) on either one waveguide of the two waveguides 14 and 15 in the second MZI 7. Here, the first thin film heaters C and D are driven, that are formed on the first waveguide 10 having the shorter waveguide length in the first MZI 6 at the first step, and the second thin film heaters G and H are driven, that are formed on the second waveguide 15 having the longer waveguide length in the second MZI 7 at the second step, as the initial phase difference between the two MZIs 6 and 7 is assumed to be smaller than the required phase difference as π/2 therebetween. Moreover, the phases of the both MZIs 6 and 7 are adjusted, for being the phase difference between the first and the second MZIs 6 and 7 to be the required phase difference as π/2 therebetween, by driving the thin film heaters C and D at the first step and driving the thin film heaters G and H at the second step. Here, it may be able to perform at the similar time (timing), or it may be also available to perform at the different timing, regarding the driving of the thin film heaters at the first step, the driving of the thin film heaters at the second step, and regarding the first step and the second step.

At the time thereof, an absolute value of a phase adjustment amount for the first MZI 6 by driving the first thin film heaters C and D is to be as similar to the absolute value of the phase adjustment amount for the second MZI 7 by driving the second thin film heaters G and H.

That is to say, the absolute value of the phase adjustment amount for each of the first and the second MZIs 6 and 7 is a half of the phase subtracted the initial phase difference between the first and the second MZIs 6 and 7 from π/2. For example, if the initial phase difference is π/16, the absolute value of the phase adjustment amount for being shifted in each of the MZIs 6 and 7 equals to 7π/32 as the half of the phase subtracted the initial phase difference (π/16) from π/2.

Thus, the phase is shifted to a shorter wavelength side as 7π/32 by driving the first thin film heaters C and D in the first MZI 6, and the phase is shifted to a longer wavelength side as 7π/32 by driving the second thin film heaters G and H in the second MZI 7. Hence, the phase difference between the first MZI 6 and the second MZI 7 becomes to be adjusted to π/2 in total. Here, said the phase difference is defined as The phase difference =

The phase of the second $MZI7$ − The phase of the first $MZI6$.

2. In case that an initial phase difference between the MZIs 6 and 7 is larger than the above required phase difference π/2 therebetween, the second thin film heaters A and B in the first MZI 6 and the first thin film heaters E and F in the second MZI 7 are driven.

That is to say, there are performed the first step to drive the thin film heaters (A and B, or C and D) on either one waveguide of the two waveguides 10 and 11 in the first MZI 6, and the second step to drive the thin film heaters (E and F, or G and H) on either one waveguide of the two waveguides 14 and 15 in the second MZI 7. Here, the second thin film heaters A and B are driven, that are formed on the second waveguide 11 having the longer waveguide length in the first MZI 6 at the first step, and the first thin film heaters E and F are driven, that are formed on the first waveguide 14 having the shorter waveguide length in the second MZI 7 at the second step, as the initial phase difference between the two MZIs 6 and 7 is assumed to be larger than the required phase difference as π/2 therebetween. Moreover, the phases of the both MZIs 6 and 7 are adjusted, for being the phase difference between the first and the second MZIs 6 and 7 to be the required phase difference as π/2 therebetween, by driving the thin film heaters A and B at the first step and driving the thin film heaters E and F at the second step. Here, it may be able to perform at the similar time (timing), or it may be also available to perform at the different timing, regarding the driving of the thin film heaters at the first step, the driving of the thin film heaters at the second step, and regarding the first step and the second step.

At the time thereof, the absolute value of the phase adjustment amount for the first MZI 6 by driving the second thin film heaters A and B is to be as similar to the absolute value of the phase adjustment amount for the second MZI 7 by driving the first thin film heaters E and F as well.

That is to say, the absolute value of the phase adjustment amount for each of the MZIs 6 and 7 is the half of the phase subtracted the initial phase difference from π/2. For example, if the initial phase difference defined is (π/2+π/16), the absolute value of the phase adjustment amount for being shifted in each of the MZIs 6 and 7 equals to π/32 as the half of the phase subtracted the initial phase difference (π/2+π/16) from π/2.

Thus, the phase is shifted to the longer wavelength side as π/32 by driving the second thin film heaters A and B in the first MZI 6, and the phase is shifted to the shorter wavelength side as π/32 by driving the first thin film heaters E and F in the second MZI 7. Hence, the phase difference between the first MZI 6 and the second MZI 7 becomes to be adjusted to π/2 in total.

According to the present embodiment including the above mentioned structure, the following functions and advantages are able to be obtained.

The first thin film heaters C and D in the first MZI 6 and the second thin film heaters G and H in the second MZI 7 are driven in case that the initial phase difference between the MZIs 6 and 7 is smaller than the required phase difference between the MZIs 6 and 7 as π/2. Hence, the phase is shifted to the shorter wavelength side by driving the first thin film haters C and D in the first MZI 6, and similarly, the phase is shifted to the longer wavelength side by driving the second thin film haters G and H in the second MZI 7. Thus, it is able to decrease the power (the voltage) applied to each of the heaters and to shorten the period of power supplying to each of such the heaters, because it is able to adjust the half of the required phase adjustment amount by driving the first thin film heaters C and D and to adjust the remaining half by driving the second thin film heaters G and H. Therefore, it becomes able to realize the delay-line demodulator having the excellently small polarization dependent frequency (PDF).

On the contrary, the second thin film heaters A and B in the first MZI 6 and the first thin film heaters E and F in the second MZI 7 are driven in case that the initial phase difference between the two MZIs 6 and 7 is larger than the required phase difference between the MZIs 6 and 7 as π/2. Hence, the phase is shifted to the longer wavelength side by driving the second thin film haters A and B in the first MZI 6, and similarly, the phase is shifted to the shorter wavelength side by driving the first thin film haters E and F in the second MZI 7. Thus, it is able to decrease the power (the voltage) applied to each of the heaters and to shorten the period of power supplying to each of such the heaters, because it is able to adjust the half of the required phase adjustment amount by driving the second thin film heaters A and B and to adjust the remaining half by driving the first thin film heaters E and F. Therefore, it becomes able to realize the delay-line demodulator having the excellently small polarization dependent frequency.

It may be able to adjust the half of the phase subtracted the initial phase difference from the required phase difference by driving the first heaters C and D in the first MZI 6, and to adjust the remaining half by driving the second heaters G and H in the second MZI 7, in case that the initial phase difference between the MZIs 6 and 7 is smaller than the required phase difference between the MZIs 6 and 7 as π/2 for example. Meanwhile, it may be able to adjust the half of the phase subtracted the initial phase difference from the required phase difference by driving the second heaters A and B in the first MZI 6, and to adjust the remaining half by driving the first heaters E and F in the second MZI 7, in case that the initial phase difference is larger than the required phase difference as π/2 for example therebetween.

It is able to decrease the power (the voltage) applied to each of the heaters, and to shorten the period of power supplying to each of such the heaters, in each case that the initial phase difference is smaller or larger than the required phase difference. Therefore, it becomes able to realize the delay-line demodulator having the excellently small polarization dependent frequency.

It is able to suppress the polarization dependent frequency of the transmittance spectrum for the signal light propagating through each of the MZIs 6 and 7, because the half-wave plate 21 as just one plate is arranged at the central parts of the two waveguides 10 and 11 in the first MZI 6 and at the central parts of the two waveguides 14 and 15 in the second MZI 7. Thus, it becomes able to realize the delay-line demodulator having the further small polarization dependent frequency.

The second waveguide 11 in the first MZI 6 is formed to be turned at the central part thereof, for the central part of the second waveguide 11 coming close to the first waveguide 10. Similarly, the second waveguide 15 in the second MZI 7 is formed to be turned at the central part thereof, for the central part of the second waveguide 15 coming close to the first waveguide 14. Thus, it is able to package in the small size for the device, by forming the second waveguides 11 and 15 in each of the MZIs 6 and 7 to be turned at each of the central parts respectively.

That is to say, the substrate size for the demodulator becomes large, in which such as the MZIs and the like are formed thereon, due to widely extending outwards the central parts of the second waveguide 11 and 15 in case that the second waveguides 11 and 15 are not turned. On the contrary, it is able to miniaturize the substrate for the demodulator 1, because the second waveguides 11 and 15 are turned at the central parts respectively thereof, for not being widely extended outwards the central parts of the second waveguides 11 and 15 respectively.

The second waveguides 11 and 15 in each of the MZIs 6 and 7 are formed to be turned at the central parts respectively thereof. Therefore, it is able to improve the decrease in the manufacturing cost, because just the one small half-wave plate 21 becomes available instead of using some large sized expensive half-wave plates, in the case of arranging any one of the half-wave plates in the region including the central parts of the two waveguides 10 and 11 in the first MZI 6 and the central parts of the two waveguides 14 and 15 in the second MZI 7.

AN EXAMPLE

A delay-line demodulator device of a 40 Gbps transfer rate for differential quadrature phase shift keying (DQPSK) is manufactured on a silicon substrate 20 by using a flame hydrolysis deposition method, a photolithography method, a reactive ion etching method, and the like, which comprises a Y-branch waveguide 3 and Mach-Zehnder interferometers (MZIs) 6 and 7 comprised of a quartz based glass (refer to FIG. 1).

Tantalum based thin film heaters A to H are formed on waveguides 10, 11, 14 and 15 in each of the MZIs 6 and 7 by using a spattering method. Moreover, a heater length is to be 13000 um and a heater width is to be 80 um, for each of the thin film heaters A to H.

Furthermore, a half-wave plate 21 is inserted into central parts of both of the MZIs 6 and 7 for suppressing a polarization dependent frequency of the transmittance spectrum for the signal light propagating through each of the MZIs. Moreover, the inserting area of the half-wave plate 21 is to be as small as possible, by turning the waveguides 11 and 15 at the central parts thereof, that have longer waveguide lengths than that of the waveguides 10 and 14 in each of the MZIs 6 and 7 respectively, for easy insertion of the half-wave plate 21 thereinto, and for suppressing a size of the expensive half-wave plate. Furthermore, it becomes able to package in a small size for the delay-line demodulator device chip, by turning such the waveguides at the central parts thereof. Here, circuit parameters are shown in Table 1 as below for manufacturing such the delay-line demodulator device.

TABLE 1

| Item | |
|---|---|
| Relative refractive index difference Δ | 0.8% |
| Free spectral range (FSR) | 23 GHz |
| Design wavelength | 1552.525 nm |
| Amount of delay ΔL | 8820 um |

Moreover, an optical fiber array is connected to an optical input waveguide 2 and to each of optical output waveguides 23 to 26 thereafter. Thus, a simplified module is manufactured, in which it is possible to supply power to each of the thin film heaters A to H from outside for a phase trimming.

An initial phase difference between the MZIs 6 and 7 is measured before supplying power, and the measured initial phase difference is $7\pi/16$. Therefore, a phase adjustment amount for shifting at each of the MZIs 6 and 7 is assumed as $\pi/32$, which is equal to $(\pi/2-7\pi/16)/2$. And, a voltage of 70 V is applied for four seconds to each of the thin film heaters C and D in the MZI 6 and to each of the thin film heaters G and H in the MZI 7 respectively.

Figure 2:
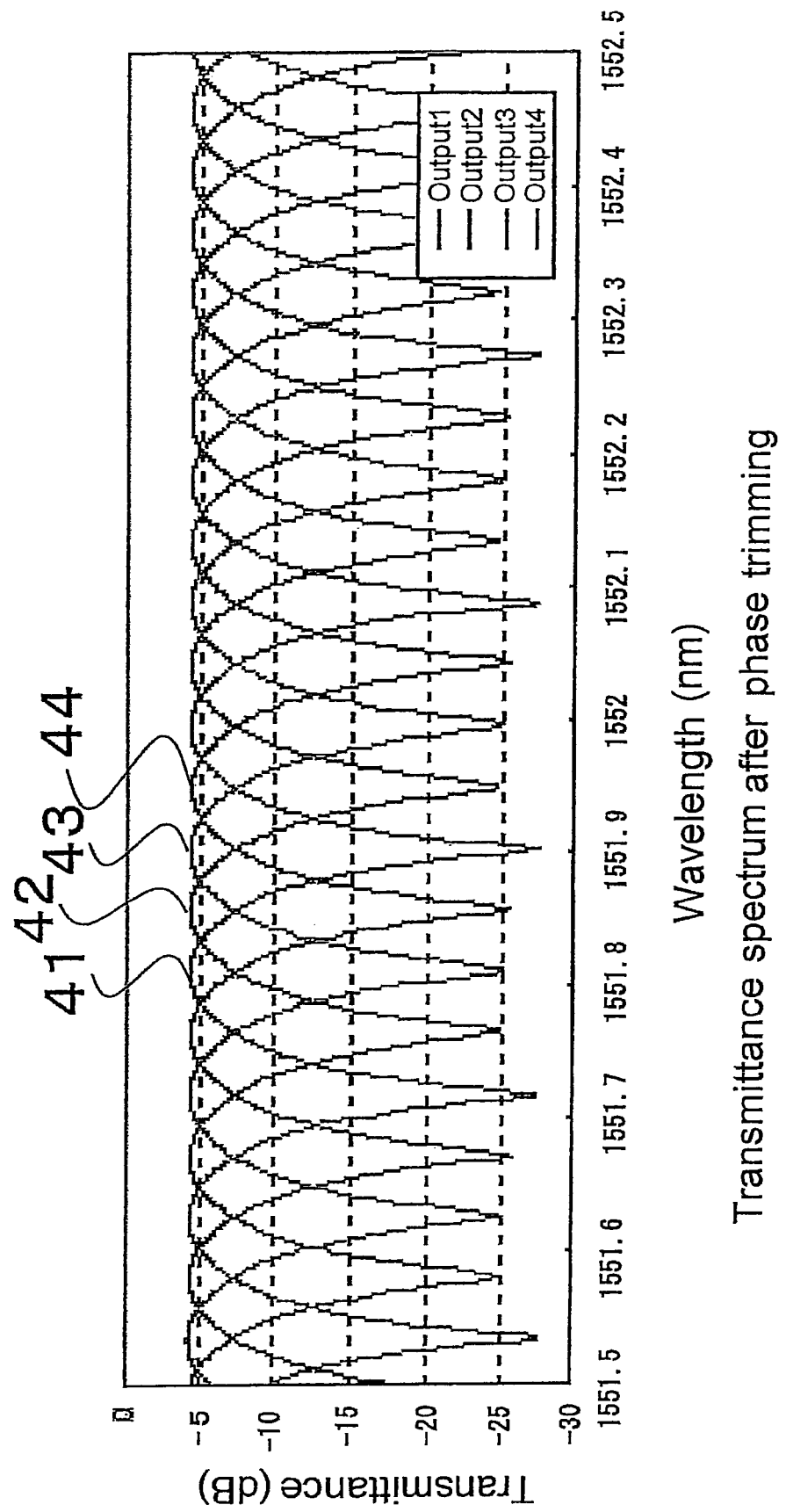
FIG. 2 is a graph showing a transmittance spectrum after a phase trimming in a delay-line demodulator according to one embodiment of the present invention.

A transmittance spectrum after the phase trimming are shown in FIG. 2. A curved line 41 shows a transmittance spectrum output from an output 1 shown in FIG. 1, a curved line 42 shows the transmittance spectrum output from an output 2, a curved line 43 shows the transmittance spectrum output from an output 3, and a curved line 44 shows the transmittance spectrum output from an output 4, in FIG. 2 respectively.

According to FIG. 2, it is obvious that the phase is shifted as $\pi/2$ between that of the MZI 6 and that of the MZI 7, which means that the phase of the MZI 6 is shifted to a shorter wavelength side as $\pi/32$ and that of the MZI 7 is shifted to a longer wavelength side as $\pi/32$. Moreover, the polarization dependent frequency is measured as not more than 0.005 nm, which is a value for being able to sufficiently acceptable for the delay-line demodulator of DQPSK.

Figure 3:
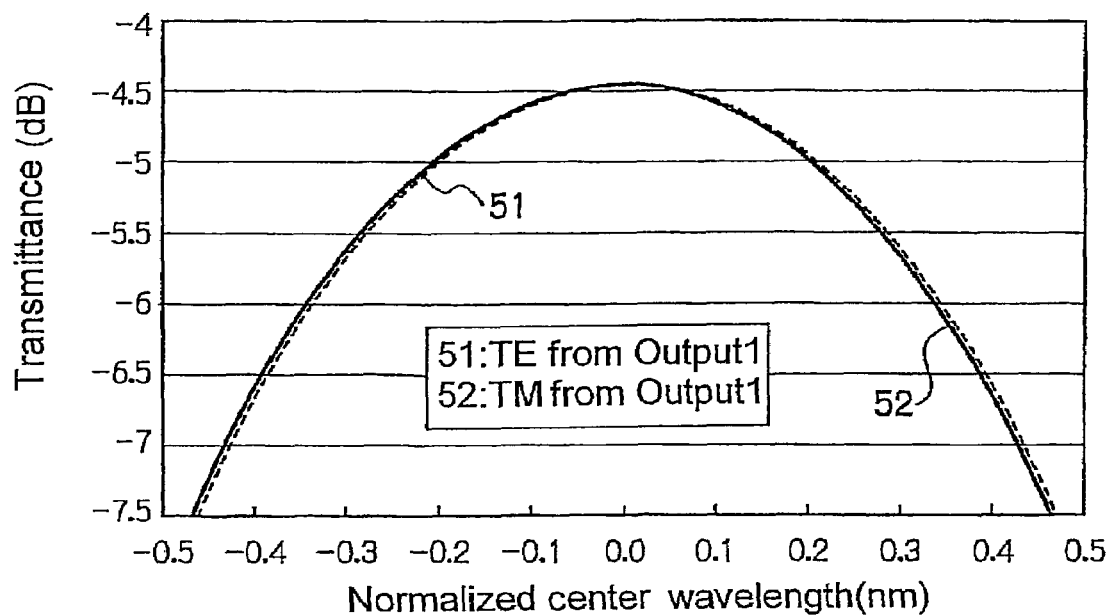
FIG. 3 is a graph showing a polarization dependent frequency after a phase trimming in a delay-line demodulator according to one embodiment of the present invention.

Moreover, a transmittance spectrum of a transverse electric (TE) polarized light output from the output 1 (TE from Output 1) is shown as a curved line 51 and that of a transverse magnetic (TM) polarized light output from the output 1 (TM from Output 1) is shown as a curved line 52 in FIG. 3 respectively. According to FIG. 3, it is obvious that the polarization dependent frequency is excellently small, as both of the curved lines 51 and 52 are overlapped almost completely.

Moreover, the present invention is also able to be embodied with modifying as follows.

According to the above described one embodiment, two thin film heaters are formed on both of the two waveguides in each of the MZIs 6 and 7 respectively. However, the present invention is not limited to such the configuration. For example, the present invention is also applicable to a delay-line demodulator comprising: a thin film heater formed on any one of the two waveguides 10 and 11 in the first MZI 6, as on the first waveguide 10 for example; and a thin film heater formed on any one of the two waveguides 14 and 15 in the second MZI 7, as on the second waveguide 15 for example. Or, on the contrary, the present invention is also applicable to a delay-line demodulator comprising: a thin film heater formed on another one of the two waveguides 10 and 11 in the first MZI 6, as on the second waveguide 11 for example; and a thin film heater formed on another one of the two waveguides 14 and 15 in the second MZI 7, as on the first waveguide 14 for example.

According to the above described one embodiment, the second waveguides 11 and 15 in each of the MZIs 6 and 7 are formed to be turned at the central parts respectively thereof. However, the present invention is also applicable to a delay-line demodulator comprising any one of waveguides without being turned at a central part thereof.

According to the above described one embodiment, there is described the configuration that the half-wave plate 21 is inserted into the central parts for both of the MZIs 6 and 7. However, the present invention is also applicable to a delay-line demodulator consisting of the configuration without any one of half-wave plates.

According to the above described one embodiment, two thin film heaters are formed on each of the waveguides 10 and 11 in the MZI 6 respectively, and two thin film heaters are formed on each of the waveguides 14 and 15 in the MZI 7 as well. However, the present invention is also applicable to a delay-line demodulator comprising a thin film heater formed on any one of waveguides in an MZI.

The present invention is not limited to the above described embodiments and various; further modifications may be possible without departing from the scope of the present invention.

This application is based on the published Japanese patent application No. 2005-092217 filed on Sep. 17, 2004 and the published Japanese patent application No. 2008-49222 filed on Feb. 29, 2008, entire content of which is expressly incorporated by reference herein.

What is claimed is:

1. A delay-line demodulator comprising:
    a first 2×2 Mach-Zehnder interferometer and a second 2×2 Mach-Zehnder interferometer connected to two waveguides branched from an optical input waveguide respectively;
    at least one heater formed on each of two waveguides having different waveguide length and forming the first Mach-Zehnder interferometer; and
    at least one heater formed on each of the two waveguides having different waveguide length and forming the second Mach-Zehnder interferometer.

2. The delay-line demodulator as claimed in claim 1, wherein two heaters are formed on each of the two waveguides in the first Mach-Zehnder interferometer, and two heaters are formed on each of the two waveguides in the second Mach-Zehnder interferometer.

3. The delay-line demodulator as claimed in claim 2,
wherein a half-wave plate is inserted into a central part of the two waveguides in the first Mach-Zehnder interferometer and a central part of the two waveguides in the second Mach-Zehnder interferometer.

4. The delay-line demodulator as claimed in claim 3,
wherein the two heaters are formed on each of the two waveguides in the first Mach-Zehnder interferometer for sandwiching the half-wave plate therebetween, and the two heaters are formed on each of the two waveguides in the second Mach-Zehnder interferometer for sandwiching the half-wave plate therebetween.

5. The delay-line demodulator as claimed in claim 3,
wherein a waveguide having a longer waveguide length of the two waveguides in each of the first and the second Mach-Zehnder interferometers is turned at a central part thereof, for the central part of the waveguide having the longer waveguide length coming close to another waveguide having a shorter waveguide length.

6. A method of adjusting a phase shift in a delay-line demodulator in which a first 2×2 Mach-Zehnder interferometer and a second 2×2 Mach-Zehnder interferometer are connected to two waveguides branched from an optical input waveguide respectively, at least one heater is formed on each of two waveguides having different waveguide length and forming the first Mach-Zehnder interferometer, and at least one heater is formed on each of two waveguides having different waveguide length and forming the second Mach-Zehnder interferometer, the method comprising:
a first step driving the heater on any one of the two waveguides in the first Mach-Zehnder interferometer; and
a second step driving the heater on any one of the two waveguides in the second Mach-Zehnder interferometer,
wherein a phase adjustment of the first and the second Mach-Zehnder interferometers is performed by driving the heater at the first step and by driving the heater at the second step.

7. The method of adjusting the phase shift in the delay-line demodulator as claimed in claim 6,
wherein the heater is driven at the first step, which is formed on a first waveguide having a shorter waveguide length of the two waveguides in the first Mach-Zehnder interferometer, and the heater is driven at the second step, which is formed on a second waveguide having a longer waveguide length of the two waveguides in the second Mach-Zehnder interferometer, in case that an initial phase difference between the first and the second Mach-Zehnder interferometers is smaller than a required phase difference therebetween, and
wherein the heater is driven at the first step, which is formed on a second waveguide having a longer waveguide length of the two waveguides in the first Mach-Zehnder interferometer, and the heater is driven at the second step, which is formed on a first waveguide having a shorter waveguide length of the two waveguides in the second Mach-Zehnder interferometer, in case that the initial phase difference is larger than the required phase difference therebetween.

8. The method of adjusting the phase shift in the delay-line demodulator as claimed in claim 7,
wherein absolute values of a phase adjustment amount for both of the first and the second Mach-Zehnder interferometers are the same.

9. The method of adjusting the phase shift in the delay-line demodulator as claimed in claim 8,
wherein the absolute value of the phase adjustment amount for each of the first and the second Mach-Zehnder interferometers is a half of a phase subtracted the initial phase difference between the first and the second Mach-Zehnder interferometers from $\pi/2$.

10. The method of adjusting the phase shift in the delay-line demodulator as claimed in claim 7,
wherein two heaters are formed on each of the two waveguides in the first Mach-Zehnder interferometer, and two heaters are formed on each of the two waveguides in the second Mach-Zehnder interferometer,
wherein the two heaters (C and D) formed on the first waveguide in the first Mach-Zehnder interferometer are driven at the first step, and the two heaters (G and H) formed on the second waveguide in the second Mach-Zehnder interferometer are driven at the second step, in case that the initial phase difference is smaller than the required phase difference therebetween, and
wherein the two heaters (A and B) formed on the second waveguide in the first Mach-Zehnder interferometer are driven at the first step, and the two heaters (E and F) formed on the first waveguide in the second Mach-Zehnder interferometer are driven at the second step, in case that the initial phase difference is larger than the required phase difference therebetween.

11. The method of adjusting the phase shift in the delay-line demodulator as claimed in claim 6,
wherein the first step and the second step are performed at a state in which a half-wave plate are inserted into a central part of the two waveguides in each of the first and the second Mach-Zehnder interferometers.

* * * * *